June 15, 1926.                L. E. PARKER                1,588,904
FEED DEVICE FOR BELT CONVEYERS
Filed April 4, 1924
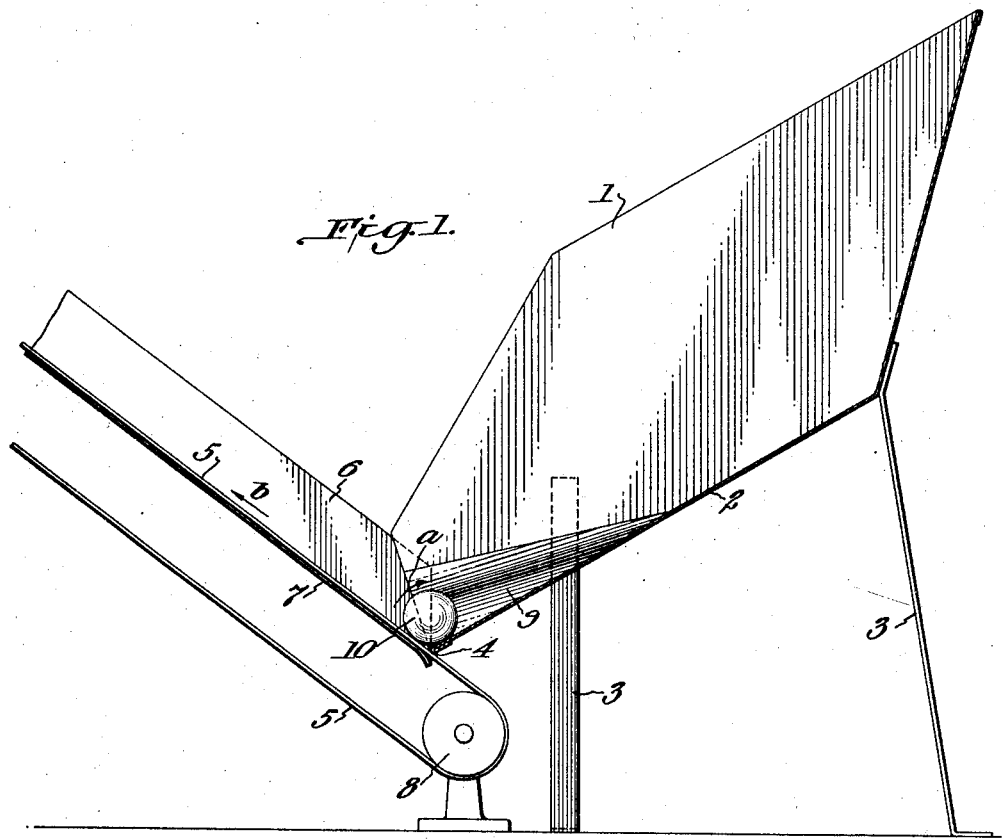
Fig. 1.
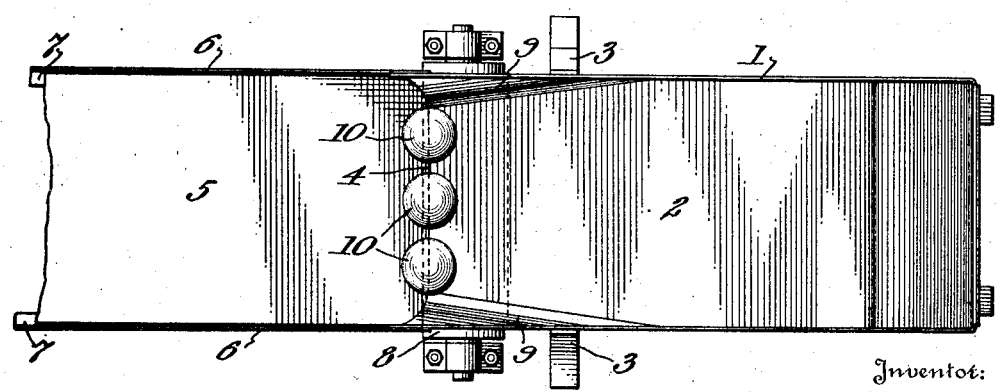
Fig. 2.
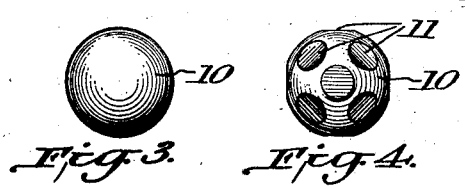
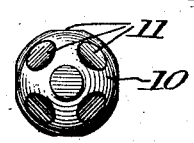
Fig. 3.    Fig. 4.
Inventor:
Lucian E. Parker
by Wm. N. Timmel
Attorney.

Patented June 15, 1926.

1,588,904

UNITED STATES PATENT OFFICE.

LUCIAN E. PARKER, OF WADSWORTH, OHIO, ASSIGNOR TO THE OHIO MATCH COMPANY, OF WADSWORTH, OHIO, A CORPORATION OF OHIO.

FEED DEVICE FOR BELT CONVEYERS.

Application filed April 4, 1924. Serial No. 704,257.

In the manufacture of matches, and particularly in the boxing of matches, especially by automatic machinery, a great deal of what is termed "waste" is accumulated consisting of matches which, although ordinarily perfect in themselves, have dropped out of various chutes and conveyers or have been packed in boxes which have become mutilated in their progress through the box filling or sliding machine and have been taken out and thrown into the waste receptacle by the operators and attendants of the machines. Obviously, this accumulation of matches would if it were thrown away amount in a short time to a considerable loss, and therefore this waste is saved, cleaned (that is lint, splinters, broken matches, parts of boxes and other extraneous matter removed) and is then packed.

The present invention relates primarily to a device adapted to feed such waste in bulk to a box filling machine, and its main object is to automatically so distribute the matches when dumped in a mass into the hopper of the feeding device that they will be substantially evenly distributed over a conveyer belt or the like, to the end that they will fall into the feed trough of the box filling machine in even distribution throughout a substantial portion of its length as determined by the width of the feed belt or the like above referred to, and will not fall into such trough in such numbers at any one point therein as to cause an accumulation of matches at such point which will not be easily handled by the trough.

To this end, the invention consists in a feed device for belt or the like conveyers comprising essentially a hopper having a discharge end, a travelling belt or conveyer cooperating with said hopper at its discharge end and adapted to receive articles from the hopper and convey and transfer them to a point of discharge, and one or more bodies of revolution arranged in said hopper at its discharge end and acted upon by the conveyer, whereby rotary movement is imparted to the bodies and a mass of articles deposited in said hopper is, by the action of said bodies thereon and on the hopper itself, fed to and distributed across the discharge end of the hopper and of the conveyer for the purpose specified.

In the accompanying drawings illustrating the invention, in the several figures of which like parts are similarly designated, Figure 1 is a longitudinal vertical section of a device embodying my invention. Fig. 2 is a plan view thereof. Figs. 3 and 4 illustrate two forms of bodies of revolution which are adapted to perform the operations necessary to the carrying out of the desired function of the device.

1 is a hopper having an inclined bottom 2 and supported at a suitable elevation by any appropriate supports 3. Cooperating with the discharge end 4 of the hopper is a belt or other conveyer 5 preferably running between guards 6 and supported upon flanges 7 which may form a part of the guards 6. This conveyer travels around suitable pulleys, only one of which, indicated by the numeral 8, is shown.

In order that no whorl may be formed at the sides of the trough adjacent to its discharge end, I provide flashings 9 which serve to guide articles traveling down the bottom of the hopper away from the corners and into the zone of action of the bodies of rotation hereinafter described.

Within the hopper at its discharge end and resting partly upon the bottom 2 and partly upon the conveyer 5 are arranged one or more bodies of rotation 10, which are, as shown, preferably spherical bodies, and to these bodies motion is imparted in the direction of the arrow $a$, Fig. 1, by cooperation therewith of the conveyer 5 which obviously travels in the direction of the arrow $b$, Fig. 1.

The rotation of these bodies 10, as described, causes them to jump or bump around upon the conveyer 5 and the bottom 2 of the hopper, thereby producing vibration of the hopper and tending to aid gravity in the feed of articles along the bottom of the hopper.

If it be found that plain bodies of rotation, such as the spheres shown in Figs. 1, 2 and 3 do not, because of their smooth surface, jump or bump around sufficiently to impart the desired vibration to the hopper, these bodies may be provided with a plurality of flattened portions or faces 11, as shown in Fig. 4, whereby when rotary movement is imparted to them by the conveyer 5 their vibratory influence upon the hopper will be accentuated.

In addition to causing vibration of the trough 1, the bodies 10 tend to break up and distribute the mass of articles descending toward the bottom of the hopper and to spread the articles evenly and substantially isolated from each other throughout the width of the conveyer 5.

I have shown in Fig. 2 of the drawings three of the bodies 10 arranged in the hopper, and this number I have found to operate efficiently in a hopper having a discharge end of the width shown relatively to the size of the bodies 10, but, obviously, more or fewer of these bodies may be used depending upon their size and relative width of hopper.

The operation of the device is substantially as follows:—Assuming that waste matches, as hereinabove referred to, are to be fed to a box filling machine, we will say that the hopper 1 will be arranged in proximity to the match receiving trough of the filling machine and the conveyer 5 will extend from the discharge end of the hopper to such a position with respect to said trough that the matches carried upward by the conveyer will be thrown therefrom into the trough.

Assuming that power has been applied to drive the conveyer 5, a quantity of matches will be dumped into the hopper 1. The travel of the conveyer 5 and its consequent action upon the bodies 10 will cause these bodies to impart vibratory motion to the hopper and this vibratory motion will cause the matches to feed down the bottom of the hopper to the point where they come in contact with the bodies 10. These bodies 10, being in rotation, will have a tendency to dig into the mass of matches and cause them to feed in an evenly distributed manner from the discharge end of the hopper and upon the conveyer.

I have herein referred to the operation of this device as particularly adapted to the feeding of matches, but it is to be understood that it can be used with satisfactory results in the feeding of other articles.

Various changes in details of construction and arrangement of parts are contemplated as within the spirit of the invention and the scope of the following claims.

What I claim is:—

1. In a feed device for belt conveyers, a hopper adapted to receive a quantity of articles in bulk and having a discharge end, a conveyer arranged adjacent to and travelling past said discharge end, and a body of rotation arranged in said hopper and supported by and deriving motion from said conveyer for the purpose of feeding said articles to and distributing them upon said conveyer.

2. In a feed device for belt conveyers, a hopper having an inclined bottom and a discharge end, a conveyer arranged adjacent to and travelling past said discharge end, and a body of rotation mounted in said hopper and resting partly upon the bottom thereof and partly upon said conveyer and adapted to receive motion from said conveyer, whereby articles deposited in bulk in said hopper will be fed to and distributed upon said conveyer.

3. In a feed device for belt conveyers, a hopper having an inclined bottom and a discharge end, a conveyer arranged adjacent to and travelling past said discharge end, and a plurality of bodies of rotation arranged in said hopper and supported partly by said bottom and partly by said conveyer and deriving motion from said conveyer, whereby vibration is imparted to said hopper and articles deposited therein in bulk are influenced to travel by gravity down said bottom and are distributed upon said conveyer.

4. In a feed device for belt conveyers, a hopper having an inclined bottom and a discharge end, a conveyer arranged adjacent to and travelling past said discharge end, and a plurality of substantially spherical bodies arranged in said hopper and deriving rotary motion from said conveyer, whereby articles deposited in bulk in said hopper will be fed to and distributed upon said conveyer.

5. In a feed device for belt conveyers, a hopper having an inclined bottom and a discharge end, a conveyer arranged adjacent to and travelling past said discharge end, and a plurality of substantially spherical bodies provided with a plurality of flat faces arranged in said hopper and deriving rotary motion from said conveyer, whereby articles deposited in bulk in said hopper will be fed to and discharged and distributed upon said conveyer.

6. In a feed device for belt conveyers, a hopper having an inclined bottom and a discharge end, a conveyer arranged adjacent to and travelling past said discharge end, and a plurality of polygonal bodies of rotation arranged in said hopper and in contact with said conveyer and deriving rotative motion from said conveyer and imparting vibration to said hopper, whereby articles deposited in bulk in said hopper will be fed down the bottom thereof toward said discharge end and discharged and distributed upon said conveyer.

7. In a feed device for belt conveyers, a hopper having an inclined bottom and a discharge end, a conveyer arranged adjacent to and travelling past said discharge end, a body of rotation arranged in said hopper and deriving motion from said conveyer, and flashings arranged at the sides of said hopper adjacent to its discharge end, said hopper adapted to receive articles in bulk to be fed to said conveyer, said body of rotation adapted to aid in feeding and to distribute said articles to and upon said conveyer, and said flashings arranged to direct the course of feed of said articles in the hopper into the zone of influence of said body of rotation.

In testimony whereof I have hereunto set my hand this 31st day of March A. D. 1924.

LUCIAN E. PARKER.